Jan. 12, 1932.     Z. D. WILLIAMS     1,840,549
WHEELED GANG PLOW
Original Filed Aug. 22, 1929   3 Sheets-Sheet 3
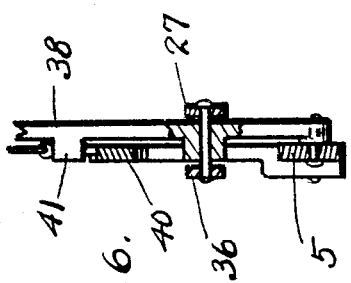
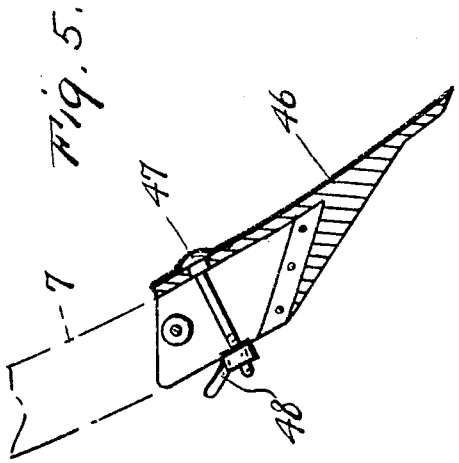
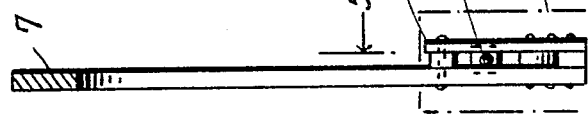
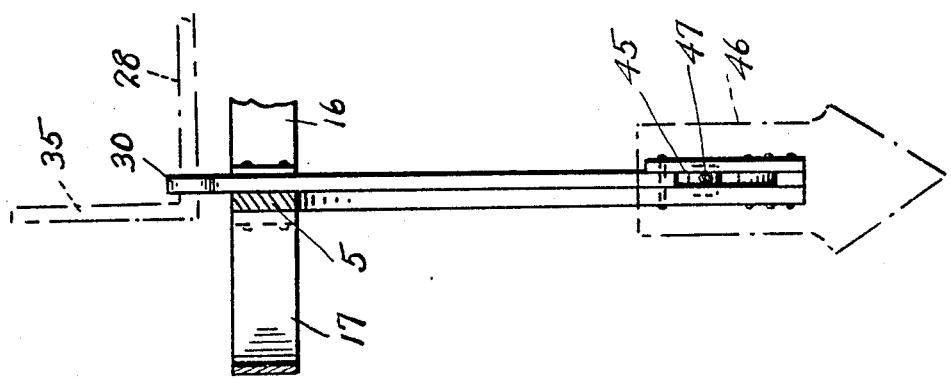
Inventor
Z. D. Williams
By Clarence A. O'Brien
Attorney Patented Jan. 12, 1932

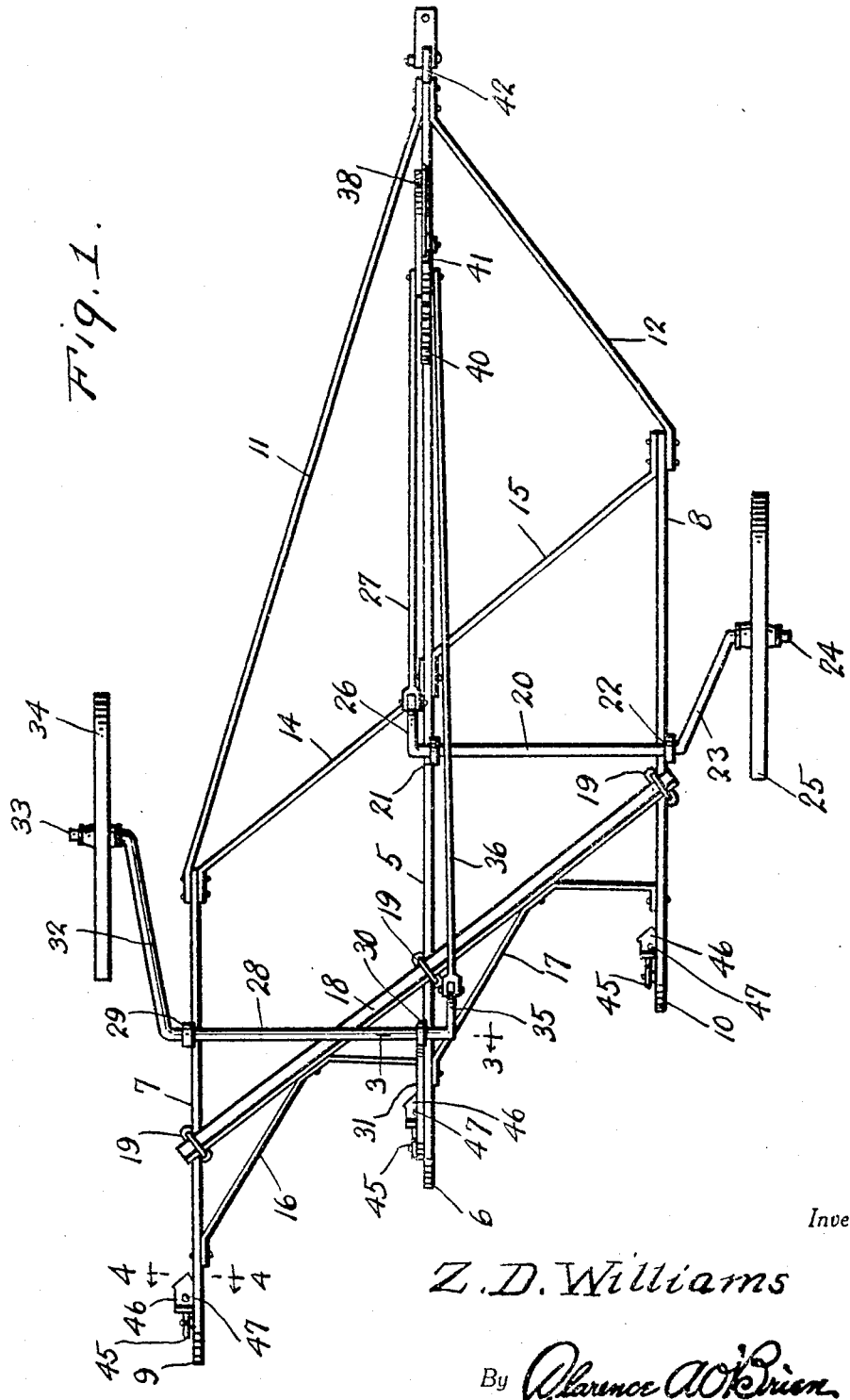

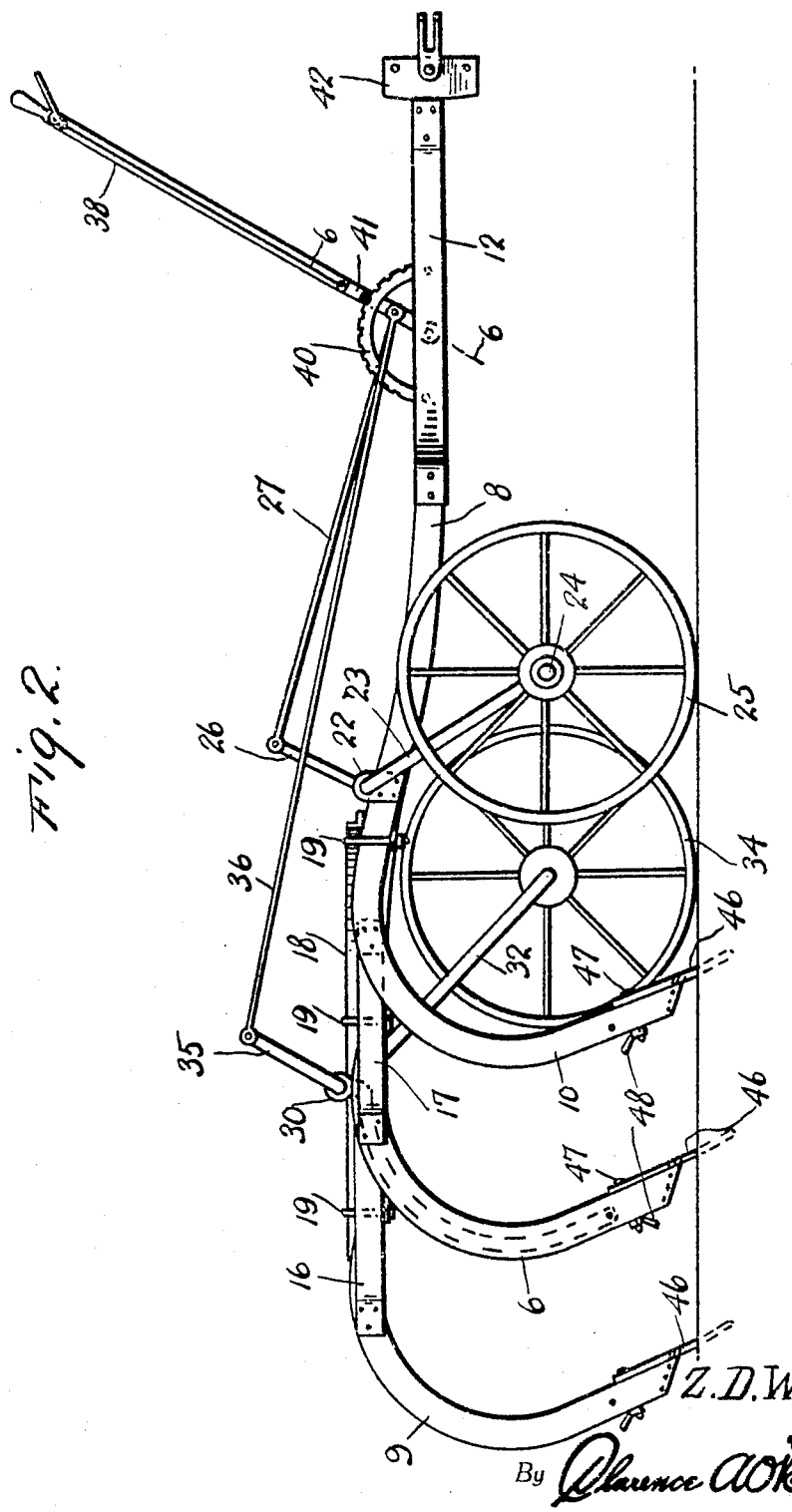

1,840,549

UNITED STATES PATENT OFFICE

ZEBULIN D. WILLIAMS, OF UNIONVILLE, NORTH CAROLINA

WHEELED GANG PLOW

Application filed August 22, 1929, Serial No. 387,692. Renewed June 26, 1931.

The present invention relates to a gang plow of the wheeled type and has for its prime object to provide an easily and conveniently operated lifting means for the plow.

Another very important object of the invention resides in the provision of a wheeled gang plow structure for this class which is strong and durable, comparatively inexpensive to manufacture, easy to assemble and disassemble, thoroughly efficient and reliable in its use and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawings:

Figure 1 is a top plan view of the plow embodying the features of my invention.

Figure 2 is a side elevation thereof.

Figure 3 is a detail sectional view, taken substantially on the line 3—3 of Figure 1.

Figure 4 is a detail sectional view, taken substantially on the line 4—4 of Figure 1.

Figure 5 is a detail section taken substantially on the line 5—5 of Figure 4, and Figure 6 is a section substantially on the line 6—6 of Figure 2.

Referring to the drawings in detail, it will be seen that the numeral 5 denotes an elongated center bar which merges at its rear end into a downwardly curved plow beam 6. Numerals 7 and 8 denote side bars which merge at their rear ends in downwardly curved plow beams 9 and 10 respectively. The bars 7 and 8 are of the same length while the bar 5 is longer. The front end of the bar 8 terminates rearwardly of the front end of the bar 5 and the front end of the bar 7 terminates rearwardly of the front end of the bar 8. The plow beam 6 is disposed forwardly of the plow beam 9 and the plow beam 10 is disposed forwardly of the plow beam 6.

Braces 11 and 12 are attached to the forward end of the bar 5 and diverge rearwardly from each other, the brace 11 being fixed to the forward end of the bar 7 while the brace 12 is fixed to the forward end of the bar 8. Diagonal braces 14 are disposed between the forward end of the bar 7 and the intermediate portion of the bar 5, while a brace 15 is disposed between said intermediate portion of the bar 5 and the front end of the bar 8. Substantially V-shaped braces 16 and 17 are disposed respectively between the rear portions of bars 7 and 5 and bars 8 and 5 and the apices of these braces 16 and 17 are fixed to a diagonal brace bar 18, which is clamped as at 19, to the bars 7, 5, and 8.

A crank shaft 20 is journaled in bearings 21 and 22 on bars 5 and 8 respectively and is formed with outer obliquely disposed cranks 23 terminating in an outwardly directed stub axle 24, on which is journaled the right hand wheel 25 and at the inner end of the shaft 20 is formed a crank 26 to which is attached a link 27. A crank shaft 28 is journaled in bearings 29, and 30, on bars 7 and 5 respectively, the bearing 30 having a curved extension 31, fixed alongside of the beam 6. The crank shaft 28 includes an obliquely disposed outer crank 52, terminating in an outwardly directed stub axle 33 on which is journaled a wheel 34, and at the inner end is formed with a crank 35, with which is engaged a link 36. A lever 38 is rockably mounted on the forward portion of the bar 5 and the links 27 and 36 are engaged therewith so that by swinging the lever 38, the shafts 20 and 25 may be rocked for raising and lowering the frame. A notched quadrant 40 is provided on the bar 5 and the detent structure 41 is provided on the latter for cooperation therewith.

Suitable draft means 42 is provided at the front end of the bar 5. Plates 45 are mounted on the lower ends of the plow beams 6, 9, and 10, in spaced relation thereto by suitable spacing means, so that plows 46 may be held in place on the ends of the plow beams by means of bolts 47 and nuts 48, the bolt 47 passing between the beams and the plates 45.

It will be seen that these plows may be very easily removed for sharpening purposes.

It will further be noted that the plows may be easily lifted from the ground when so desired or may be adjusted to dig at the desired depth.

It will also be noted that the wheels are located to the outside of the frame, so that the right hand wheel may be run in the left formed furrow as a guide.

It is thought that the construction, utility and advantages of this invention will now be quite apparent to those skilled in this art, without a more detailed description thereof. The present embodiment of the invention has been disclosed in considerable detail, merely for the purposes of exemplification, since in actual practice it attains the features of advantage enumerated as desirable in the statement of the invention and the above description.

It is apparent that changes in the details of construction and in the combination and arrangement of parts may be resorted to, without departing from the spirit or scope of the invention as hereinafter claimed or sacrificing any of its advantages.

What is claimed is:

A wheeled gang plow comprising central and side plow-carrying beams disposed in relatively spaced parallel relation with their plows obliquely disposed and arranged one in advance of the other, the side beams being of the usual length and the central beam being of greater length than the side beams and having draft means at its forwardly disposed end, diagonally disposed connecting braces extending forwardly between the forward end of the central beam and the forward ends of the respective side beams, diagonal connecting braces extending rearwardly between the forward ends of the respective side beams and the intermediate portion of the central beam, said forwardly and rearwardly extending diagonal braces forming a triangular connection and bracing frame between the said beams, a brace bar extending diagonally of the rear portions of the beams in substantial parallelism with the adjacent side of the triangular bracing frame, means securing the brace bar to each beam, and wheeled supporting means for the said beams including means for raising and lowering the said beams.

In testimony whereof I affix my signature.

ZEBULIN D. WILLIAMS.